United States Patent [19]

Needles et al.

[11] 3,933,607

[45] Jan. 20, 1976

[54] SENSITIZED VAPOR PHASE PHOTO-GRAFTING OF MONOMERS ONTO SURFACES

[75] Inventors: Howard L. Needles; Rita P. Seiber, both of Davis, Calif.

[73] Assignee: The Regents of the University of California, Berkeley, Calif.

[22] Filed: Aug. 22, 1973

[21] Appl. No.: 390,574

[52] U.S. Cl.. 204/159.15; 204/159.12; 204/159.16; 204/159.17; 260/8; 260/17 A; 260/17.4 GC; 260/857 G; 260/859 R; 260/859 PV; 260/873; 260/878; 260/884; 260/885; 260/886
[51] Int. Cl.² .................... C08F 8/00; C08L 1/12
[58] Field of Search..... 204/159.15, 159.19, 159.23, 204/159.18

[56] References Cited
UNITED STATES PATENTS

| | | | |
|---|---|---|---|
| 2,940,869 | 6/1960 | Graham | 204/159.19 |
| 3,088,791 | 5/1963 | Cline et al. | 204/159.15 |
| 3,090,664 | 5/1963 | Cline et al. | 204/159.15 |
| 3,625,744 | 12/1971 | Juna et al. | 204/159.23 |

FOREIGN PATENTS OR APPLICATIONS 835,121   5/1960   United Kingdom............ 204/159.22

*Primary Examiner*—Murray Tillman
*Assistant Examiner*—Thurman K. Page
*Attorney, Agent, or Firm*—Flehr, Hohbach, Test, Albritton & Herbert

[57] ABSTRACT

A process for the vapor phase graft copolymerization of a monomer vapor onto a polymeric substrate in the presence of a source of light at low energy levels and a photosensitive vapor (e.g. a diketone) activated by such low energy. The product of said process.

11 Claims, No Drawings

SENSITIZED VAPOR PHASE PHOTO-GRAFTING OF MONOMERS ONTO SURFACES

BACKGROUND OF THE INVENTION

Graft copolymers have been formed by techniques in which a polymeric substrate is wet out with a solution of a monomer and subjected to ionizing radiation to cause the monomer to polymerize in grafted form on the substrate. One example of this technique is illustrated in Cline et al, U.S. Pat. No. 3,090,664 in which an unsaturated organic acid or salt is grafted onto a nitrogen containing polymer substrate. According to this patent, the bulk of the irradiation received by the wet fabric comprises photons at wave lengths less than 3000 A. Optional photoinitiators activated by ultraviolet light are indicated by the patent as a means for reducing the ultraviolet light exposure required for grafting. Such photoinitiators are disclosed as being added in the liquid form together with the monomer.

The process of the Cline et al patent has a number of disadvantages. Because the monomer is added in a liquid form and penetrates deeply into the polymeric substrate, it tends to homopolymerize within the substrate as well as on the surface. Thus, a relatively thick uneven layer of homopolymer is deposited. In certain instances such as grafting of monomers for permanent press characteristics, such a thick coating results in undesirable tactile properties such as roughness, stiffness and poor draping. In addition, where the polymeric substrate is a fiber, the excess liquid monomer tends to form bridges across fibers within the fabric during polymerization leading to unsightly spot welding which also contributes to fabric stiffness.

Another disadvantage to graft polymerization using a liquid monomer is that there is a substantial waste of excess monomer which is homopolymerized on the substrate surface. Also, addition of the photoinitiator in liquid form also is wasted.

Irradiation at the relatively high energy disclosed in the Cline et al patent (less than 3000 A.) produces detrimental effects upon the polymeric substrate. Noticeable effects are discoloration of the substrate and reduction in tensile strength.

Another disadvantage of the above technique is that when the optional photoinitiator is employed, it is added as a liquid. Such photoinitiators, which are normally colored, tend to stain or discolor the fabric when added in this form.

SUMMARY OF THE INVENTION AND OBJECTS

It is a general object of the invention to graft a monomer onto a polymeric substrate in a manner which overcomes the aforementioned disadvantages of the prior art.

It is a particular object of the invention to provide a graft polymerization technique in which the monomer is applied in the vapor phase thereby forming a relatively thin and uniform coating upon the surface of the polymeric substrate.

It is a further object of the invention to perform the grafting process in the presence of relatively low energy light so as to avoid detrimental effects on the polymeric substrate.

Additional objects and features of the invention will appear from the following description in which the preferred embodiments are set forth in detail.

In accordance with the above objects a vapor phase method for forming a graft copolymer in the presence of low energy, irradiation is provided. In a first step, a wetting agent is deposited upon the surface of a polymeric substrate in forms such as fiber, fabric, film or sheets. Suitable polymeric substrates include cellulose and its derivatives, protein-containing polymers, polyamides, polyurethanes, vinyl polymers including polyolefins and polyesters.

Thereafter, the polymeric substrate is contacted with a monomer and photosensitive vapor in the presence of low energy radiation. Suitable monomers include unhalogenated vinyl monomers including substituted groups selected from the group consisting of organic acids, esters and ethers, and cyanide.

It is preferable that the light energy be at a relatively low level, i.e., characterized by a majority, and preferably at least 75–90%, of photons having wavelengths over 3000 A.

The present method is predicated upon the discovery that certain photosensitive vapors are capable of being activated by exposure to the above low energy light to a state sufficient to create grafting sites on the polymeric substrates to thereby graft polymerize a monomer at the sites. In addition, it is important that the photosensitive materials have sufficient vapor pressure at the conditions of reaction to be in the vapor form so as to avoid discoloration of the polymeric substrate. Suitable photosensitive monomers include volatile diketones and $\alpha, \beta$ unsaturated carbonyl compounds.

It has been found that the use of a wetting agent is highly desirable to increase the rate of graft polymerization to an economically feasible level. Such wetting agent should have an affinity for the polymeric substrate, monomer and photosensitive vapor. The rate of grafting is further increased where the monomer is soluble in the wetting agent.

DESCRIPTION OF THE PREFERRED EMBODIMENTS

Briefly described, the present process comprises a vapor phase method for forming a graft copolymer in the presence of low energy irradiation. In a first step a wetting agent is deposited upon the polymeric substrate. Thereafter, a polymeric substrate is placed in a closed system into which a monomer and a photosensitive material, both in the vapor phase, are supplied in the presence of low energy radiation.

The technique of graft polymerization is basically a free radical mechanism. Active grafting sites are created on the polymeric substrate by exposure to energy sources such as irradiation. Monomers are caused to polymerize at these reactive sites to form a final structure comprising the polymeric substrate with appendant polymerized monomer units.

In accordance with the present invention, the grafting site is created by means of irradiation activating a photosensitive vapor which, in turn, transfers this energy directly to a surface of the polymeric substrate. In the absence of the photosensitive vapor, the low energies of irradiation employed would not creat sufficient grafting sites for purposes of the invention.

The polymeric substrate may be in any form which is desired for the end product. Such form includes fibers, fabric, sheet, and film. For purposes of the present discussion, it will be assumed that the substrate is in fabric form.

In a first step the polymeric substrate (fabric) is prewet with a wetting agent. This may be accomplished, for example, by dipping the fabric into the wetting agent. After wetting, excess solvent is removed from the fabric as by squeezing.

The wetting agent comprises a material with an affinity for the polymeric substrate, monomer, as well as the photosensitive vapor. Most efficient and uniform grafting is accomplished where the monomer is also soluble in the wetting agent. Thus, the wetting agents are dependent upon the particular graft polymerization system. Certain common wetting agents, as set forth in the examples, include water, alcohol, formamides, and the like.

In one system of a batch type, the fabric substrate is placed in a closed system which includes a light energy source as well as inlet openings for monomer vapor and sensitizer vapor. Before introduction of these vapors, the system is flushed suitably with an inert gas such as nitrogen or steam to remove the oxygen which inhibits polymerization. Where the grafting is to occur with atmospheric pressure, it is preferable that the nitrogen be supplied at a slight positive pressure such as from 1.01 to 1.1 atmosphere.

The technique for supplying monomer to the closed system is dependent upon its vapor pressure characteristics. Typically, the monomer is in a liquid state at room temperature but possesses sufficient vapor pressure for being entrained in a carrier gas bubbling through a solution of monomer. For this purpose, the same inert gas used to flush the system may be bubbled through the monomer and thereafter directed into the closed chamber containing the polymeric substrate. Where the monomer does not have sufficient vapor pressure at room temperature for this technique, it may be heated to a limited extent. For this purpose, it is preferable not to heat the monomer above say 100° to 120° to avoid homopolymerization. Alternatively a vacuum could be drawn, but this is relatively expensive.

It may be desirable to entrain the monomer in a vaporized liquid in which the monomer is soluble to improve the entrainment of monomer in a vapor state. In one system of this type, for example, superheated steam is passed through acrylic acid monomer and thereafter into the closed system. Of course, another reason that the steam tends to increase the monomer input is that it heats the monomer for increased vapor pressure.

The same techniques for supplying monomer to the system may also be employed to supply a sensitizer. A relatively small portion of sensitizer is necessary in comparison to the monomer. Thus, where the same rate of flow of carrier gas is bubbled through the sensitizer and into the closed system, sensitizer is diluted in a suitable solvent, such as water, which will not interfere with the reaction. For this purpose the sensitizer may be diluted on the order of one part sensitizer to 100 parts or more of water.

In the present process, excess polymer and photosensitizer vapors are directed out of the system after contact with the polymer substrate through a gas outlet at the opposite side of the reaction chamber. These vapors may be recycled and join the inlet stream leading to economy of reactants. This is in contrast to the relatively high loss of reactants when a graft polymerization in the presence of irradiation is carried out in the liquid phase.

A suitable apparatus for the above system includes a closed chamber with at least one inlet for sensitizer vapor and monomer. As explained hereinafter, the sensitizer and monomer may be supplied simultaneously and thus through the same inlet opening. On the other hand, it may be desirable to supply sensitizer and monomer at different flow rates and at different times. Thus, it is preferable that the apparatus include at least two inlet openings. A source of inert gas under pressure is bubbled through separate containers of monomer and the sensitizer solution to carry the vapors into the closed chamber. A vapor outlet is provided for the removal of these gases.

For uniform grafting, it is preferable that the source of radiation be equidistant from all portions of the polymeric substrate. Suitable apparatus to accomplish this objective includes a centrally located source of light energy and means for mounting the substrate on an arc line formed with a source of ultraviolet light at the center. A water jacket may be provided around the light source for cooling.

As explained in detail hereinafter, the low energy characteristic of the light received by the polymeric fabric is highly important. It is preferable that the majority of the light energy comprise photons having wavelengths of an excess of 3000 A. At least 75% of the photons should have wavelengths over 3000 A. Conversely, it is preferable to filter out the major portion of the relatively high energy light with wavelengths below the above values. Since such high energy is not necessary in accordance with the present invention, it is preferable to filter all but trace amounts of such high energy irradiation. A suitable light source for the above purpose is a Pyrex glass-filtered mercury arc lamp. The Pyrex glass filters at least 90% of the light energy below 3000 A. The intensity is varied depending upon the distance of the fabric and the desired time interval of grafting. The required intensity is decreased as the time of exposure is increased. Typical light sources may be on the order of 100 to 450 watts. The Pyrex glass filters out wavelengths below about 3000 A.

It is apparent that the intensity (watts/cm$^2$) and time of irradiation according to the present process are interrelated. That is, at higher intensities, the graft polymerization occurs in a relatively short period of time while the time increases as the intensity of irradiation is decreased.

Alternative apparatus to the foregoing may be utilized where continuous graft polymerization is desired. For example, any conventional continuous means for conveying a film or fabric may be utilized, such as rollers. Such rollers would be disposed within an enclosed chamber into which a sensitized vapor and monomer are introduced and exposed to a light source.

An important feature of the present invention is the discovery that free radical sites on a polymeric substrate may be created indirectly, that is, by the transfer of energy from a photosensitive vapor in the presence of relatively low energy radiation. For this purpose, it is necessary that the photosensitizer be activated at the aforementioned low energy levels sufficiently to create grafting sites. In other words, photosensitive material should be highly absorptive of light energy and below energy wavelength set forth above. In addition, since the process occurs in the vapor phase, it is necessary that the photosensitive material have sufficient volatility at the operating conditions of the reaction to be in vapor form. For economic reasons, it is preferable that the reaction chamber be maintained at a pressure close to atmospheric and at a temperature close to room temperature.

At the above conditions, it has been found that α-diketones, especially biacetyl, are suitable photosensitive vapors. Biacetyl is highly absorptive at wavelengths of 3600 to 4600 A. Other suitable diketones include hexane-3, 4-dione, cyclohexane-½, 2-dione or glyoxal. Other usable compounds which have the requisite absorption to energy at the above wavelengths are the α, β unsaturated carbonyl group such as benzaddelyde, acrolein and crotonaldehyde. It should be understood that the other photosensitive materials that possess the foregoing characteristics may be employed in accordance with the present invention.

A wide variety of polymeric substrates may be employed for purposes of the present invention. A broad grouping of such materials includes cellulose and its derivatives, protein-containing polymers, polyamides, polyurethanes, vinyl polymers, and polyesters.

The term "cellulose" is intended to include various forms such as paper, cotton, flax, and blends of cellulose with other materials such as a polyester-cotton fabric. The cellulose derivatives include cellulose esters, such as cellulose acetate and triacetate, cellophane film, and regenerated cellulose such as rayon.

The protein-containing polymers include natural fibers such as wool and mohair and copolymers of proteins with other monomers.

The polyamides include the various forms of nylon. The polyurethanes include spandex.

As used herein, suitable vinyl polymers include acrylics, such as acrylonitrile, modacrylics, such as copolymers of acrylonitrile and vinyl chloride, polystyrene, polyvinyl esters, polyvinyl ethers, polyvinyl alcohols and their derivatives and condensation polymers such as polyesters. Particularly suitable polyolefins include polyethylene and polypropylene.

Since the graft polymerization of the present invention is a surface phenomenon, it is preferable that the substrate be in a form which presents a large amount of surface area to the monomer. Thus, good grafting reactions occur by the use of fabrics comprised of fibers or with relatively porous sheets such as filter paper. For example, polyethylene fibers are more readily grafted than polyethylene films. On the other hand, many films such as cellulose derivatives are highly grafted.

Suitable monomers according to the present invention, are relatively polar and comprise unhalogenated vinyl monomers including substituted groups selected from the group consisting or organic acids and their derivatives, organic and inorganic esters and ethers. The term "unhalogenated vinyl monomer" means that the vinyl portion of the monomer includes no diirect substitution of a halogen group. On the other hand, this is not meant to exclude halogen substitution removed from the vinyl group as in an inorganic vinyl ester such as, vinyl phosphonate. This term excludes, for example, vinyl chloride as a monomer as it has not been found to be an effective grafting monomer according to the present invention. It is believed that vinyl chloride is not sufficiently polar.

Suitable substituted groups for the above vinyl monomers include vinyl organic acids and derivatives such as acrylic acid and methacrylic acid and derivatives. Vinyl organic esters include alkyl acrylates such as, methyl acrylate, butyl acrylate, methyl methacrylate. Vinyl inorganic esters include vinyl phosphonate, and bis (2-chloroethyl) vinyl phosphonate. Substitute vinyl organic esters include 2,2,2 trifluoroethyl methacrylate, N,N-dimethylaminoethyl methacrylate, hexafluoroisopropyl acrylate and heptafluoroisopropylethyl acrylate. The vinyl cyanide monomers include acrylonitrile, and methacrylonitrile.

It should be apparent that many monomers which fall within the above definition, other than the ones specifically set forth, may be employed depending upon the desired end use. For example, the vinyl phosphonates are grafted for the specific purpose of imparting flame resistent characteristics to the polymer substrate.

The foregoing vapor phase graft polymerization process includes many advantages over solution processes. Formation of ungrafted monomer is minimized. No wet pickup of monomer or drying cycle to remove monomers is required for the process since the vapor monomer is not deposited in excess on the surface of the polymer substrate as in the solution process. Furthermore, relatively thin uniform graft coatings may be accomplished according to the present invention in comparison to the relatively thick graft copolymers produced during the solution process.

Another important reason for carrying out the present process in the vapor phase is that photosensitizers in general and the ones particularly set forth above are characterized by distinct colors (yellow). If the sensitizer is applied in the liquid phase, it would be incorporated into the polymeric substrate and color the same. On the other hand, it has been found that by utilizing the photosensitizer in the gaseous phase that this tendency to color the polymeric substrate is eliminated.

The mechanism of the present invention is believed to occur as follows: Light from an irradiation source is absorbed by the photosensitive vapor at relatively low energies, e.g., wavelengths in excess of 3600 A., to produce electronically excited molecules which are capable of abstracting hydrogen atoms from the polymeric substrate to form free radicals thereon. These radicals on the substrate are believed to react with monomer vapor through successive addition of monomer units until the growing radical abstracts a hydrogen ion from some other source in the system. The resulting graft polymer chains are chemically bonded to the substrate.

The gas phase reaction of the present invention produces a graft copolymer with a large percentage of graft polymerization in comparison to homopolymerization. This has been established by solvent extraction of the polymerized monomer in which, say, less than 5% was dissolved. Since a true graft polymer would not dissolve, this indicates a ratio of graft polymer to homopolymer on the order of 95:5. This is in marked contrast to the product of the solution grafting techniques.

The above mechanism is believed to differ from prior art high energy radiation techniques in which the active grafting sites are directly created by exposure to the light energy. This requires high levels of irradiation which tend to photodegrade the polymer substrate causing decreased tensile strength and discoloration.

Electron microscopic examination of surfaces and cross sections of graft copolymer samples of the present invention illustrates that the product is highly uniformly deposited in a relatively thin coating on the substrate surface in comparison to that obtained by solution techniques.

The present process has a number of important commercial applications, as more fully illustrated in the examples. For example, ionic groups may be introduced onto nonionic textile fibers to give dye affinities to such fibers. For this purpose, for example, acrylic acid may be grafted onto nylon, polyester, polyolefin, to render such substrates dyeable in the presence of basic dyes. Other modifications of the surface characteristics of the substrate polymers by the present process include the introduction of hydrophilic or hydrophobic polymers onto films to improve their affinity or resistance respectively, to water. Also, the process may be used to alter the liquid and gas permeability characteristics of films.

Other physical and mechanical properties of polymeric substrates such as fibrous films and fabrics may be altered according to the present invention. For example, the following properties may be modified: water absorbency, tensile properties, solvent solubility, heat resistance, heat conductivity, electrical properties, abrasion resistance, wrinkle resistance, pilling resistance, hand, luster, flamability and launder ability. Specific chemical properties which may be modified include resistance to acids, alkalis, oxydizing and reducing agents, insects, mildew, and Rd, In order to more clearly disclose the nature of the present invention, specific examples of graft polymerization are hereinafter given. It should be understood, however, that this is done by way of example and is intended neither to delineate the scope of the invention nor limit the appended claims. Unless otherwise indicated, values in parenthesis under the headings "Test Results or Data" indicate results for the ungrafted control substrate. The symbols rd, $a$, and $b$ are a standard form of color identification.

EXAMPLE 1

This example illustrates an acrylic acid monomer grafted onto a polymeric substrate comprising cotton fabric (Test Fabrics 80 × 80 print cloth, No. 400W).

The cotton samples (3×6 inches) were wet out with water and excess removed using a laboratory pad. The samples were stapled to a wire screen and placed in a photochemical reactor equipped with two gas inlets and one gas outlet of the type described above. A stream of nitrogen (5 cc/sec) was passed through a 1.0% aqueous solution of biacetyl and then into the photochemical reactor for 25 minutes. At the same time a super-heated steam was passed through acrylic acid and into the reactor. During the last 20 minutes the samples were irradiated with a 200-W pyrex-filtered mercury arc from 6 cm distance. After irradiation the samples were extracted with hot water, dried, and conditioned.

The percentage uptake of grafted monomer was 6.9%.

| Properties of the Grafted Surface | |
|---|---|
| Test Procedure or Method | Test Results or Data |
| Soil Release: Oily Stain Release Method (AATCC 130-1969) Washing Procedure II Dyeings (1% owf) at 100°C for 60 min. at a 200:1 liquor ratio. | Stain Release Rating = 2.3 (3.5) |
| Basic Blue 4 with 5% sodium sulfate | Basic Blue 4 Rd = 47:1 (53.5), $a = -15.9$ (−13.0), $b = -12.0$ (−16.0) |

The graft of polyacrylic acid on the cotton caused the cotton to have a lower stain release rating and altered the dyeing properties. The cotton dyed to a deeper shade with the basic dye but was somewhat uneven.

EXAMPLE 2

This example illustrates an acrylic acid monomer grafted onto a polymeric substrate comprising cotton fabric (Test Fabrics 80 × 80 print cloth, No. 400W).

The cottom samples (3×6 inches) were wet out with water and excess removed by passing the samples through a laboratory pad. The samples were stapled to a wire screen and placed in a photochemical reactor equipped with two gas inlets and a gas outlet. Streams of nitrogen were passed through a 1.0% aqueous solution of biacetyl (5 cc/sec) and neat acrylic acid (5 cc/sec) and into the reactor for 30 minutes. During the final 15 minutes, the samples were irradiated with a 450-W pyrex-filtered mercury arc from 6 cm distance. Following irradiation, the samples were washed with hot water, dried, and conditioned.

The percentage uptake of grafted monomer was 2.7%.

| Properties of the Grafted Surface | |
|---|---|
| Test Procedure or Method | Test Results or Data |
| Basic Dyeings (3% owf) with 5% sodium sulfate and 1% acetic acid at 80°C for 60 min. with a 200:1 liquor ratio. | |
| Basic Blue 1 | Basic Blue 1 - Dyed to a deep blue shade, while untreated control dyed to a light blue. Both dyeings were somewhat uneven. Rd = 8.0 (44.5), $a = -10.0$ (−16.7), $b = -39.7$ (−17.3) |
| Basic Violet 14 | Basic Violet 14 - Dyed to a deep violet color with slight unevenness, while untreated cotton dyed light purple. Rd = 3.6 (18.4), $a = 30.7$ (47.0), $b = 1.1$ (−16.5) |
| Basic Red 2 | Basic Red 2 - Dyed to a deep red with some spottiness, while untreated cotton dyed dark pink. Rd = 8.7 (29.4), $a = 42.6$ (40.3), $b = 13.4$ (0.9). |
| Basic Yellow 2 | Basic Yellow 2 - Dyed to a medium yellow-green, while untreated cotton dyed to a light yellow. Rd = 55.2 (74.6), $a = -15.0$ (−13.8), $b = 46.3$ (37.6) |

The treated cotton dyed to much deeper, fast shades than untreated cotton with a number of basic dyes. This treatment affords a method to dye cotton with bright basic dyes for which it normally has no affinity.

EXAMPLE 3

This example illustrates an acrylic acid monomer grafted onto a polymeric substrate comprising nylon fabric (Test Fabrics, spun type 200, No. 358).

The same as Example 1 except 3×6 inches nylon samples were used.

The percentage uptake of grafted monomer was 24.7%.

| Test Procedure or Method | Properties of the Grafted Surface Test Results or Data |
|---|---|
| Soil Release: Oily Stain Release Method (AATCC 130-1969) Washing Procedure II Dyeings (1% owf) at 100°C for 60 min. and 200:1 liquor ratio. | Stain Release Rating = 3.5 (3.7) |
| Basic Blue 4 with 5% sodium sulfate | Basic Blue 4 - Dyed to a very deep blue with slight unevenness, while control nylon dyed a very pale blue. Rd = 5.8 (29.0), a = −9.4 (−14.7), b = 27.9 (−9.4) |
| Acid Green 3 with 5% sodium sulfate | Acid Green 3 - The fabric dyed to a pale even blue while the control dyed deep blue-green. Rd = 20.5 (8.1), a = −24.5 (−26.3), b = −13.7 (−9.1) |

EXAMPLE 4

This example illustrates an acrylic acid monomer grafted onto a polymeric substrate comprising nylon fabric (Test Fabrics spun type 200, No. 358).

The same as Example 2, except 3 × 6 inches nylon samples were used.

The percentage uptake of grafted monomer was 2.5%.

| Test Procedure or Method | Properties of the Grafted Surface Test Results or Data |
|---|---|
| Basic Dyeings (3% owf) with 5% sodium sulfate and 1% acetic acid at 80°C for 60 min. with a 200:1 liquor ratio. | |
| Basic Blue 1 | Basic Blue 1 - Dyed to a medium blue with some unevenness of shade, while control nylon dyed to a pale blue. Rd = 13.9 (45.9), a = −19.2 (−17.9), b = −37.4 (−10.9) |
| Basic Violet 14 | Basic Violet 14 - Dyed to a deep violet, while untreated nylon dyed medium violet. Rd = 6.3 (16.2), a = 61.0 (59.8), b = −20.1 (−28.9) |
| Basic Red 2 | Basic Red 2 - Dyed to dark red, while untreated nylon dyed pink. Rd = 14.9 (27.1), a = 56.5 (45.5), b = 9.6 (−9.4) |
| Basic Yellow 2 | Basic Yellow 2 - Dyed to a medium yellow-green, while control dyed light yellow. Rd = 54.1 (68.0), a = −22.1 (−13.2), b = 40.9 (26.3) |

The treated nylon showed greatly improved dyeability compared to untreated with a number of basic dyes. This technique affords a method to greatly enhance the affinity of nylon to bright basic dyes.

EXAMPLE 5

This example illustrates an acrylic acid monomer grafted onto a polymeric substrate comprising polyester fabric (Test Fabrics Dacron Type 54, No. 754-W).

The same as Example 1 except 3 × 6 inches polyester samples were used.

The percentage uptake of grafted monomer was 1.1%.

| Test Procedure or Method | Properties of the Grafted Surface Test Results or Data |
|---|---|
| Soil Release: Oily Stain Release Method (AATCC 130-1969) Washing Procedure II. Dyeings (1% owf) at 100°C for 60 min. at 200:1 liquor ratio. | Stain Release Rating = 5.0 (3.7) |
| Basic Blue 4 with 5% sodium sulfate | Basic Blue 4 - Dyed to a light blue while control fabric showed only a trace of dye uptake. Rd = 46.7 (63.1), a = −12.1 (−3.0), b = −12.4, (3.2) |
| Basic Blue 26 with 5% | Basic Blue 26 - Dyed to deep blue |

| Test Procedure or Method | Properties of the Grafted Surface<br>Test Results or Data |
|---|---|
| sodium sulfate | with some irregularity in shade while control dyed light blue.<br>Rd = 6.8 (29.3), a = 8.4 (−6.2), b = −33.9 (−16.1) |

The treated polyester exhibited excellent oily stain release properties and affinity for basic dyes. Treatment of the polyester with poly(acrylic acid) made it possible to dye this fabric with basic dyes for which it previously had no affinity.

EXAMPLE 6

This example illustrates an acrylic acid monomer grafted onto a polymeric substrate comprising polyester fabric (Test Fabrics Dacron Type 54, No. 754-W).

The same as Example 2 except 3 × 6 inches polyester samples wet out in N,N-dimethylformamide were used.

The percentage uptake of grafted monomer was 1.2%.

| Test Procedure or Method | Properties of the Grafted Surface<br>Test Results or Data |
|---|---|
| Basic Dyeings (3% owf) with 5% sodium sulfate and 1% acetic acid at 80°C for 60 min. with a 200:1 liquor ratio. | |
| Basic Violet 14 | Basic Violet 14 - Dyed to a medium violet with some unevenness of shade, while untreated nylon was very lightly tinted.<br>Rd = 11.2 (51.6), a = 41.2 (7.6), b = −11.6 (−4.0) |
| Basic Red 2 | Basic Red 2 - Dyed to a light red, while untreated polyester was slightly tinted pink.<br>Rd = 23.6 (57.2), a = 38.2 (12.6) b = 0.3 (0.6) |

The treated polyester showed affinity for basic dyes, while untreated polyester was only slightly tinted by these ionic dyes. The treatment allows one to dye difficult-to-dye polyester with bright basic dyes.

EXAMPLE 7

This example illustrates an acrylic acid monomer grafted onto a polymeric substrate comprising polypylene fabric (Test Fabrics Herculon Type 40, 50 oz., 2 × 2 ply, No. 967).

The same as Example 2 except 3 × 6 inches polypropylene samples wet out in N,N-dimethylformamide were used.

The percentage uptake of grafted monomer was 0.2%.

| Test Procedure or Method | Properties of the Grafted Surface<br>Test Results or Data |
|---|---|
| Basic Dyeings (3% owf) with 5% sodium sulfate and 1% acetic acid at 80°C for 60 min. with a 200:1 liquor ratio. | |
| Basic Violet 14 | Basic Violet 14 - Dyed to a medium violet, while untreated polyolefin was very lightly tinted.<br>Rd = 26.4 (47.6), a = 22.6 (10.1), b = −13.8 (−2.8) |
| Basic Red 2 | Basic Red 2 - Dyed to a light pink, while untreated polypropylene was only slightly tinted.<br>Rd = 38.6 (58.0), a = 20.2 (11.8), b = 1.0 (3.6). |

The treated polypropylene fabric were successfully dyed with basic dyes, although the untreated fabric had essentially no affinity for these dyes. This technique provides a method to enhance the dyeing properties of polypropylene.

EXAMPLE 8

This example illustrates an acrylic acid monomer grafted onto a polymeric substrate comprising wool fabric (Burlington 1 × 1 Plain weave worsted, style 6561).

The same as Example 2 except 3 × 6 inches wool samples wet out in water were used.

The percentage uptake of grafted monomer was 2.3%.

| Test Procedure or Method | Properties of the Grafted Surface<br>Test Results or Data |
|---|---|
| Basic Dyeings (3% owf) with 5% sodium sulfate and 1% | |

-continued

| Test Procedure or Method | Properties of the Grafted Surface<br>Test Results or Data |
|---|---|
| acetic acid at 80°C for 60 min. at a 100:1 liquor ratio. | |
| Basic Blue 1 | Basic Blue 1 - Dyed deep blue-green with some unevenness of shade, while untreated wool dyed medium blue-green. The depth of shade was much deeper on the face of the modified wool. Rd = 3.0 (6.2), a = −2.1 (−11.6), b = −18.2 (−28.9) |
| Basic Violet 14 | Basic Violet 14 - Dyed dark with some unevenness to a violet shade, while untreated wool dyed to an even dark violet. Rd = 4.3 (3.3), a = 11.4 (30.9), b = 7.3 (0.0) |
| Basic Red 2 | Basic Red 2 - Dyed to a slightly deeper red than untreated wool. Rd = 6.5 (9.0), a = 45.0 (47.6), b = 13.8 (11.9) |
| Basic Yellow 2 | Basic Yellow 2 - Dyed to a medium yellow-green, while control dyed to a medium greenish-yellow. Rd = 47.4 (58.3), a = −16.6 (−8.3), b = 4.4 (48.7) |

The treated wool showed greatly improved dyeability with basic dyes and provides a technique to increase the affinity of bright basic dyes for wool.

EXAMPLE 9

This example illustrates an acrylamide monomer grafted onto a polymeric substrate comprising cotton fabric (Test Fabrics 80 × 80 print cloth, No. 400W).

Cotton samples (3 × 6 inches) were placed in a 20% aqueous acrylamide solution and excess solution removed by passing the fabrics through a laboratory pad. The samples were stapled to a wire screen and placed in a photochemical reactor fitted with a gas inlet and gas outlet. Nitrogen was bubbled through a 1.0% aqueous biacetyl solution (5 cc/sec) and then into the photoreactor for 45 minutes. During the last 30 minutes the samples were irradiated with a 200-W pyrex-filtered mercury arc from 6 cm distance. After irradiation the samples were washed thoroughly in hot water, dried, and conditioned.

The percentage uptake of grafted monomer was 14.1%.

the fabric were generally improved by the treatment. The fabric dyed to a deeper color with both the direct and basic dyes, but only a slight effect on the dyeing properties with procion reactive dyes was noted.

EXAMPLE 10

This example illustrates an acrylonitrile monomer grafted onto a polymeric substrate comprising cotton fabric (Test Fabrics 80 × 80 mercerized print cloth, No. 400W).

The cotton samples (3 × 6 inches) were wet out with water and excess water removed by passing the samples through a laboratory pad. The samples were stapled to a wire screen and placed in a photochemical reactor with two gas inlets and a gas outlet. Streams of nitrogen were passed through a 1.0% solution of aqueous biacetyl (1 cc/sec) and through monomer (1 cc/sec) and into the reactor for 45 minutes. During the final 30 minutes the samples were irradiated with a 200-W pyrex-filtered mercury arc from 6 cm distance. Following irradiation, the samples were extracted with benzene, washed with water, dried, and conditioned.

The percentage uptake of grafted monomer was

| Test Procedure or Method | Properties of the Grafted Surface<br>Test Results or Data |
|---|---|
| Durable Press Appearance Rating - (AATCC 124-1969) Wash Condition 1, tumble dry (2 cycles). Dyeings (1% owf) at 100°C for 60 min. and 200:1 liquor ratio | Fabric Smoothness Rating = 1.0 (1.5) |
| Direct Orange 15 | Direct Orange 15 - Dyed to a deeper richer orange than control. Rd = 67.3 (70.8), a = 4.3 (0.4), b = 18.2 (18.6) |
| Basic Blue 4 | Basic Blue 4 - Dyed a deeper blue than control. Rd + 30.0 (53.5), a = −13.3 (−13.0), b = 14.1 (−12.0) |
| Procion Red H-E3B (Reactive) | Procion Red H-E3B − Deeper pink shade than control. Rd = 61.9 (64.6), a = 19.2 (16.7), b = −2.6 (−1.6) |
| Procion Yellow H-E3G (Reactive) | Procion Yellow H-E3G - Essentially the same yellow shade as control. Rd = 77.7 (77.5), a = −2.9 (−2.8), b = 11.5 (11.6) |

The treated cotton had a slightly lower wrinkle recovery after laundering, but the dyeing properties of 7.8%.

| Test Procedure or Method | Properties of the Grafted Surface<br>Test Results or Data |
|---|---|
| Cantilever Stiffness<br>(G) (ASTM D1388-64) | G = 133 mg-cm (124 mg-cm) |
| Monsanto Wrinkle Recovery,<br>warp direction, dry and<br>wet (AATCC 66-1968) | Recovery Angles - Dry = 92° (89°),<br>Wet = 45° (46°) |
| Soil Release: Oily Stain<br>Release Method (AATCC 130-<br>1969) Washing Procedure II | Stain Release Rating = 2.8 (2.2) |
| Scanning Electron<br>Microscopy of fabric samples<br>at 525 to 2100X magnification | Findings - The polymer coating on<br>the individual fibers is extremely<br>even and uniform over the fiber<br>surfaces and no interfiber<br>bonding is found. |

Cotton fabric was successfully grafted with acrylonitrile evenly over the fabric to yield a fabric with only slightly altered properties. Although no significant increase in the wrinkle recovery or stiffness of the fabric is found, improved stain release properties for the treated fabric is found. It is known that cotton treated with acrylonitrile is mildew resistant; therefore, this treatment should also provide this property without significant alteration of fabric aesthetics.

EXAMPLE 11

This example illustrates an acrylonitrile monomer grafted onto a polymeric substrate comprising wool fabric (Burlington 1 × 1 plain weave worsted, style 6561).

The wool sample (3 × 6 inches) was wet out with methanol and attached to the immersion well of the photochemical reactor, and the reactor was assembled. Nitrogen streams were passed through a 1.0% solution of biacetyl in methanol (5 cc/sec) and neat monomer (5 cc/sec), and then into the photochemical reactor for 45 minutes. During the last 30 minutes the sample was irradiated with a 100-W pyrex-filtered mercury arc from 2 cm distance. Following irradiation, the sample was rinsed in hot water, dried, and conditioned.

The percentage uptake of grafted monomer was 11.5%.

| Test Procedure or Method | Properties of the Grafted Surface<br>Test Results or Data |
|---|---|
| Cantilever Stiffness (G)<br>(ASTM D1388-64) | G = 302 mg-cm (166 mg-cm) |
| Monsanto Wrinkle Recovery,<br>warp direction, dry and wet<br>(AATCC 66-1968) | Recovery Angles-<br>Dry = 159° (163°)<br>Wet = 79° (123°) |
| Soil Release: Oily Stain<br>Release Method (AATCC 130-<br>1969) Washing Procedure I | Stain Release Rating<br>= 1.7 (1.0) |
| Felting Shrinkage Machine | Percent Area Shrinking after |

-continued

| Test Procedure or Method | Properties of the Grafted Surface<br>Test Results or Data |
|---|---|
| wash in hot (140°F) water<br>with 5 lb. ballast and 70g<br>AATCC detergent for 15<br>min. each wash. | 5 washes - 5.0% (7.5%) |
| Durable Press Appearance<br>Ratings after tumble<br>drying (AATCC 124-1969) | Fabric Smoothness Rating<br>= 2.5 (2.1) |

Wool treated with polyacrylonitrile showed less shrinkage and better fabric smoothness after 5 launderings than untreated wool. The treated fabric also showed stain release properties superior to control. Only a slight increase in fabric stiffness and some loss in wet wrinkle recovery was caused by the treatment. Similar uptakes of acrylonitrile by solution techniques yield a stiff "boardy" fabric with similar physical properties but low aesthetic appeal.

EXAMPLE 12

This example illustrates an n-butyl acrylate monomer grafted onto a polymeric substrate comprising wool fabric (Burlington 1 × 1 plain weave worsted, style 6561).

Wool samples (3 × 6 inches) were wet out with water and excess removed by passing the samples through a laboratory pad. The samples were taped to the immersion well of the photochemical reactor and the reactor assembled. A nitrogen stream was passed through a 1.0% aqueous solution of biacetyl (5 cc/sec) and steam passed through monomer (5 cc/sec) and into the reactor for 45 minutes. During the final 30 minutes, the samples were irradiated with a 100-W mercury arc from 2 cm distance. After irradiation, the fabrics were washed with methanol and water, dried, and conditioned.

The percentage uptake of grafted monomer was 5.6%.

| Test Procedure or Method | Properties of the Grafted Surface<br>Test Results or Data |
|---|---|
| Felting Shrinkage and<br>Durable Press Rating -<br>Machine wash in hot (140°F)<br>water with 5 lb. ballast<br>and 70 g AATCC detergent<br>for 15 min. each wash.<br>Durable Press Appearance<br>Ratings after tumble drying (AATCC 124-1966). | Percent Area Shrinkage -<br>3.8% (7.5%) (5 washes)<br>Durable Press Ratings - 2.8 (2.2)<br>(5 washes) |
| Tensile Properties of yarn<br>(ASTM 2256-69) | Breaking Strength - Dry = 356±57g<br>(377±39g),<br>Wet = 320±50g (317±55g)<br>Percent Elongation at Break - Dry =<br>30±6% (36±6%), |

| Properties of the Grafted Surface | |
|---|---|
| Test Procedure or Method | Test Results or Data |
| | Wet = 50±4% (53±4%) |
| | Energy to Break - Dry = 539±176 g-cm |
| | (699±183 g-cm), |
| | Wet = 627±107 g-cm (537±277 g-cm) |

The treated wool showed high resistance to felt shrinkage and enhanced durable press properties with essentially no effect on the tensile properties of the wool. This treatment imparts wash and wear properties to wool without affecting the strength and elongation or the aesthetic properties of the wool.

EXAMPLE 13

This example illustrates a bis(2-chloroethyl)vinyl phosphonate monomer grafted onto a polymeric substrate comprising wool fabric (Burlington 1 × 1 plain weave worsted, style 6561).

Wool samples (3 × 6 inches) were placed in 10% monomer solution in methanol-water (80:20) and excess solution removed from the fabric using a laboratory pad. The wool samples were stapled to a wire screen and placed in the photochemical reactor with a gas inlet and outlet. Nitrogen (5 cc/sec) was bubbled through a 1.0% aqueous biacetyl solution and then into the photochemical reactor for 45 minutes. During the last 30 minutes the samples were irradiated with a 200-W pyrex-filtered high pressure mercury vapor lamp from 6 cm distance. Following irradiation, the samples were washed in methanol, dried, conditioned, and weighed.

The percentage uptake of grafted monomer was 2.3%.

| Properties of the Grafted Surface | |
|---|---|
| Test Procedure or Method | Test Results or Data |
| Oxygen Index Flammability Test (ASTM D2863-70) | Osygen Index = 27.25 (24.25) |

The treated wool had a significantly higher oxygen index than control wool and therefore a significant increase in the flame retardancy for the treated wool. The treated wool possessed a good hand (feel), whereas wool treated in this manner by solution polymerization techniques has a less desirable hand. This treatment appears to be a satisfactory flame retardant finish for wool without loss of hand or appearance.

EXAMPLE 14

This example illustrates a bis(2-chloroethyl)vinyl phosphonate monomer grafted onto a polymeric substrate comprising acetate fabric (Test Fabrics 2 × 2 ply staple, No. 152).

The same as Example 3 except 3 × 6 inches acetate samples were used.

The percentage uptake of grafted monomer was 1.0%.

| Properties of the Grafted Surface | |
|---|---|
| Test Procedure or Method | Test Results or Data |
| Oxygen Index Flammability Test (ASTM D2863-70) | Oxygen Index = 23.0 to 24.75 (18.25) |

The treated acetate showed a significant increase in oxygen index, although some variability was noted from sample to sample. No detachable change in hand (feel) was noted for the fabric. The treatment would serve as a flame retardant finish for acetate with little change in fabric hand.

EXAMPLE 15

This example illustrates a N,N-Dimethylaminoethyl methacrylate grafted onto a polymeric substrate comprising polyester fabric (test fabrics dacron type 54, No. 754-W).

Polyester samples (3 × 6 inches) were placed in a 10% aqueous solution of N,N-dimethylaminoethyl methacrylate and excess solution removed by passing the samples through a laboratory pad. The samples were stapled to a wire screen and placed in a photochemical reactor equipped with a gas inlet and outlet. Nitrogen was bubbled through a 1% aqueous solution of biacetyl (5 cc/sec) and into the reactor for 45 minutes. During the last 30 minutes the samples were irradiated with a 200-W pyrex-filtered mercury arc from 6 cm distance. After irradiation the samples were washed in hot water, dried, and conditioned.

The percentage uptake of grafted monomer was <0.1%.

| Properties of the Grafted Surface | |
|---|---|
| Test Procedure or Method | Test Results or Data |
| Dyeings (3% owf) at 80°C for 60 min., 5% sodium sulfate, 1% acetic acid, liquor ratio 200:1 | |
| Acid Blue 67 | Acid Blue 67 - Dyed light blue, while untreated polyester was not tinted. Rd = 43.3 (64.4), a = −1.0 (+0.1), b =−1.2 (−18.0) |
| Acid Red 27 | Acid Red 27 - Dyed light pink, while untreated polyester was not tinted. Rd = 50.3 (71.2), a = 17.8 (−0.2), b = −1.2 (+3.8) |
| Procion Red MX-5B | Procion Red MX-5B - Dyed pink while untreated polyester was only slightly tinted. Rd = 44.6 (66.5), a = 28.2 (3.5), b = −2.8 (1.6) |

The treated polyester samples possessed dyeing properties superior to untreated polyester with these acid and reactive dyes. Whereas untreated polyester was untinted by these dyes, the treated fabric dyed to light to medium shades. Therefore, it is possible to dye polyester treated by the vapor phase technique with dyes for which it ordinarily has no affinity without complex modification of the fiber.

EXAMPLE 16

This example illustrates a N,N-dimethylaminoethyl methacrylate monomer grafted onto a polymeric substrate comprising polypropylene fabric (Test Fabrics Herculon Type 40, 5 oz. 2 × 2 ply, No. 967).

The same as Example 15 except 3 × 6 inches polypropylene samples were used.

The percentage uptake of grafted monomer was 0.1%.

| Properties of the Grafted Surface | |
|---|---|
| Test Procedure or Method | Test Results or Data |
| Dyeings (3% owf) at 80°C for 60 min., 5% sodium sulfate, 1% acetic acid, liquor ratio 200:1. | |
| Acid Blue 67 | Acid Blue 67 - Dyed to a light blue, while untreated polypropylene was not tinted. Rd = 34.0 (66.8), a = −0.9 (−1.4), b = −21.9 (+5.1) |
| Acid Red 27 | Acid Red 27 - Dyed to a pink, while untreated polypropylene was not tinted. Rd = 40.2 (70.4) a = 23.0 (−1.2), b = 0.6 (7.2) |
| Procion Red MX-5B | Procion Red MX-5B - Dyed to a medium pink, while untreated polypropylene was not tinted. Rd = 35.8 (68.2), a = 34.8 (0.9), b = 0.1 (6.6) |

The treated polypropylene dyed to light to medium shades with the acid and reactive dyes, while untreated polypropylene was not tinted or colored by these dyes. Therefore, polypropylene treated by the vapor phase technique can be dyed with dyes which normally have no affinity for polypropylene.

EXAMPLE 17

This example illustrates a N,N-dimethylaminoethyl methacrylate monomer grafted onto a polymeric substrate comprising rayon fabric (Test Fabrics Viscose challis print cloth No. 266).

Same as Example 15 except 3 × 6 inches rayon samples were used.

The percentage uptake of grafted monomer was 3.8%.

| Properties of the Grafted Surface | |
|---|---|
| Test Procedure or Method | Test Results or Data |
| Dyeings (3% owf) at 80°C for 60 min., 5% sodium sulfate, 1% acetic acid, liquor ratio 200:1. | |
| Acid Blue 67 | Acid Blue 67 - Dyed to a light skittery blue, while untreated rayon was only slightly tinted. Rd = 21.8 (55.4), a = 2.8 (−0.6), b = −34.4 (−9.0) |
| Acid Red 27 | Acid Red 27 - Dyed to a light frosted red, while untreated rayon was only slightly tinted. Rd = 21.8 (62.8), a = 26.4 (7.2), b = 0.6 (0.1) |
| Procion Red MX-5B | Procion Red MX-5B - Dyed to a medium red with slightly uneven shading, while untreated rayon was lightly and unevenly tinted. Rd = 23.4 (61.0), a = 44.2 (16.6), b = 10.6 (0.2) |

Vapor phase treatment of the rayon enhanced the dyeing properties of the rayon with acid and reactive dyes, since the dye affinity was increased by the treatment.

EXAMPLE 18

This example illustrates a hexafluoroisopropyl acrylate monomer grafted onto a polymeric substrate comprising wool fabric (Burlington) 1 × 1 plain weave worsted, style 6561).

The wool samples (3 × 6 inches) were wet out in water and excess removed by passing the fabric through a laboratory pad. The samples were stapled to a wire screen and placed in a photochemical reactor equipped with two gas inlets and a gas outlet. Nitrogen streams were passed through a 1.0% aqueous biocetyl solution (3 cc/sec) and neat monomer (3 cc/sec) for 45 minutes. During the final 30 minutes, the samples were irradiated with a 100-watt pyrex-filtered mercury arc from 6 cm distance. Following irradiation the samples were washed in hot water, dried, and conditioned.

The percentage uptake of grafted monomer was 5.8%.

| Properties of the Grafted Surface | |
|---|---|
| Test Procedure or Method | Test Results or Data |
| Water Repellency: Spray Test (AATCC 22-1967) | Spray Rating = 70 (50) |
| Oil Repellency: Hydrocarbon Resistance Test (AATCC) 118-1966) | Oil Repellency Rating = <1 (<1) (Spreading of oil slower on treated fabric) |
| Soil Release: Oily Stain Release Method (AATCC 130-1969) Washing Procedure 1 | Stain Release Rating = 1.5 (1.0) |
| Scanning Electron Microscopy of fabric sample at 525 to 2100X magnification | Findings - An extremely even coating of polymer on the surface of the fibers was found. |

The treated wool had improved water repellency and stain release properties, but essentially no change in oil repellency without a great change in the aesthetic properties of the wool.

EXAMPLE 19

This example illustrates a heptafluoroisopropoyethyl acrylate monomer grafted onto a polymeric substrate comprising nylon fabric (Test Fabrics spun type 200, No. 358).

The wool samples (3 × 6 inches) were wet out with water (a) or N,N-dimethylformamide (b), stapled to a wire screen, and placed in a photochemical reactor equipped with two gas inlets and one gas outlet. Nitrogen streams (5 cc/sec) were bubbled through a 1.0% solution of biacetyl in water and the monomer and then into the photochemical reactor for 15 minutes. The nitrogen flows were continued for another 30 minutes while the samples were irradiated with a 200-W pyrex-filtered mercury arc from 6 cm distance. The samples were then washed thoroughly with hot water, dried, and conditioned.

The percentage uptake of grafted monomer was (a) = 0.5% (b) = 3.7%.

| Properties of the Grafted Surface | |
|---|---|
| Test Procedure or Method | Test Results or Data |
| Water Repellency: Spray Test (AATCC 22-1967) | Spray Rating (a) = 60 (b) = 90 (0) |
| Oil Repellency: Hydrocarbon Resistance Test (AATCC 118-1966) | Oil Repellency Rating (a) = <1 (b) = 2 (<1) |
| Soil Release: Oily Stain Release Method (AATCC 130-1969) Washing | Stain Release Ratings (a) = 5.0 (b) = 5.0 (3.7) |

-continued

| Properties of the Grafted Surface | |
|---|---|
| Test Procedure or Method | Test Results or Data |
| Procedure II | |

The nylon samples were successfully grafted with the fluoromonomer to give a fabric with a high degree of water repellency, improved oil repellency, and oil stain release properties. Wetting with N,N-dimethylformamide gave the higher uptake of fluoromonomer and therefore the greatest improvement in these properties.

EXAMPLE 20

This example illustrates a methyl acrylate monomer grafted onto a polymeric substrate comprising cotton fabric (Test Fabrics 80 × 80 print cloth No. 400W).

Cotton samples (3 × 6 inches) were wet out with water and excess removed by passing the samples through a laboratory pad. The samples were stapled to a wire screen and placed in a photochemical reactor equipped with two gas inlets and one gas outlet. Nitrogen streams were passed (5 cc/sec) through solutions of 1.0% aqueous biacetyl and monomer and into the photochemical reactor for 45 minutes. During the last 30 minutes the samples were irradiated with a 200-W pyrex-filtered mercury arc from 25 cm distance. Following irradiation, the fabrics were thoroughly extracted with ethyl alcohol, water, and then dried and conditioned.

The percentage uptake of grafted monomer was 22.1%.

| Properties of the Grafted Surface | |
|---|---|
| Test Procedure or Method | Test Results or Data |
| Cantilever Stiffness (G) (ASTM D1388-64) | G = 328 mg-cm (138 mg-cm) |
| Monsanto Wrinkle Recovery warp direction, dry and wet (AATCC 66-1968) | Recovery Angles - Dry = 73° (88°) Wet = 75° (88°) |
| Tear Resistance (Elmendorf) (ASTM D1424-63) | Tearing Force = 900 g (750 g) |
| Durable Press Appearance Rating (AATCC 124-1969), Wash Condition I, Tumble Dry | Fabric Smoothness Rating = 2.2 (1.5) |
| Water Repellency: Spray Test (AATCC 22-1967) | Spray Rating = 0 (0) |
| Oil Repellency: Hydrocarbon Resistance Test (AATCC 118-1966) | Oil Repellency Rating = <1 (<1) |

Cotton treated with poly(methyl acrylate) exhibits enhanced tear resistance and durable press properties, although slightly lower dry and wet wrinkle recoveries are observed. Although a high uptake of polymer is present, the fabric is only slightly stiffer and has the same water and oil repellency properties as untreated cotton.

EXAMPLE 21

This example illustrates a methyl acrylate monomer grafted onto a polymeric substrate comprising cellophane film.

The film 5½ × 8½ inches was soaked in water 30 minutes and excess water removed by blotting on paper towels. The film was stapled to a wire screen and placed in a photochemical reactor equipped with two gas inlets and one gas outlet. Nitrogen streams were bubbled through 1.0% aqueous biacetyl solution (5 cc/sec) and monomer (5 cc/sec) and into the reactor for 30 minutes. During the final 15 minutes the samples were irradiated with a 450-W pyrex-filtered mercury arc from 6 cm distance. The samples were washed with water, dried at 60°C, and conditioned.

The percentage uptake of grafted monomer was 4.5%.

| Properties of the Grafted Surface | |
|---|---|
| Test Procedure or Method | Test Results or Data |
| Water Permeability over a 7 day period. | Findings - There was no significant difference between the permeability of the grafted film and control. |
| Tensile properties of film (wet) (ASTM D828-60) | Tensile Strength (wet) = 129.7±37.1 (145±41.0g) % Elongation at Break (wet) = 87.0±18.7% (90.7±12.0%) Energy to Break (wet) = 260.5±80.0 g-cm (254±68.4 g-cm) |

EXAMPLE 22

This example illustrates a methyl acrylate monomer grafted onto a polymeric substrate comprising filter paper (Whatman No. 1).

Paper strips (2¼ × 6 inches) were soaked in water, stapled to a wire screen and placed in a photochemical reactor equipped with two gas inlets and one gas outlet. Nitrogen streams were bubbled through a solution of 1.0% biacetyl in water and monomer and then into the photochemical reactor for 15 minutes. The nitrogen flows were continued for another 25 minutes, while the samples were irradiated with a pyrex-filtered 200-W high pressure mercury arc from 6 cm distance. The samples were removed from the reactor, extracted with benzene, then dried and conditioned.

The percentage uptake of grafted monomer was 17.8%.

| Properties of the Grafted Surface | |
|---|---|
| Test Procedure or Method | Test Results or Data |
| Disintegration Time in water (1.0 g samples in 100 ml of water with constant shaking) | Disintergration Time = >6 hrs. Control = <1 hr |
| Wetting Properties with water and mineral oil | Wetting - complete instantaneous wetting with both water and mineral oil (same observations with control samples) |
| Tensile Properties of paper strips (ASTM D828-60). | Tensile Strength - Dry = 391±29g (400±96g), Control = 418±112g, Wet = 140±16g (88±4g), Control = 147±75g Energy to Break - Dry = 76±16 g-cm (52±14 g-cm), Control = 72±14 g-cm, Wet = 30±9 g-cm (9±1 g-cm), Control = 4±1 g-cm |

Filter paper was successfully grafted with methyl acrylate to give a product which exhibited greatly improved wet tensile properties without significant change in the wetability of the paper.

EXAMPLE 23

This example illustrates a methyl acrylate monomer grafted onto a polymeric substrate comprising nylon fabric (Test Fabrics spun type 200, No. 358).

The nylon samples (3 × 6 inches) were soaked in water for 20 minutes and excess removed by passing the samples through a laboratory pad. The samples were stapled onto a wire screen and placed in a photochemical reactor equipped with two gas inlets and a gas outlet. Nitrogen streams were passed through a 1% aqueous biacetyl solution (2.5 cc/sec) and monomer (2.5 cc/sec) and into the reactor for 50 minutes. During the final 30 minutes, the samples were irradiated with a 200-W pyrex-filtered mercury arc from 6 cm distance. Following irradiation the samples were extracted with benzene, washed with water, dried, and conditioned.

The percentage uptake of grafted monomer was 13.7%.

| Properties of the Grafted Surface | |
|---|---|
| Test Procedure or Method | Test Results or Data |
| Cantilever Stiffness (G) (ASTM D1388-64) | G = 132 mg-cm (96 mg-cm) |
| Monsanto Wrinkle Recovery, warp direction, dry and wet (AATCC 66-1968) | Recovery Angles - Dry = 116 (121) Wet = 86 (81) |
| Tensile properties of yarn (ASTM D2256-69) | Breaking Strength Dry = 847±90g (779±115g) % Elongation at Break Dry = 54±3% (52±7%) Energy to Break Dry = 1782±328 g-cm (1344±339 g-cm) |
| Scanning Electron Microscopy of fabric samples at 600 to 2400X magnification. | Findings - Essentially even distribution of polymer on the fiber surfaces with some nodes of polymer apparent. |

Nylon fabric was successfully grafted with methyl acrylate to give a product having significantly improved tensile properties. The polymer was shown to be evenly grafted onto the surface of the nylon fabric.

EXAMPLE 24

This example illustrates a methyl acrylate monomer grafted onto a polymeric substrate comprising a polyester fabric (Test Fabrics Dacron Style 54, No. 754-W).

Polyester samples were wet out in N,N-dimethylformamide (a) or dimethylsulfoxide (b) and excess solvent removed using a laboratory pad. The sample was taped to the cold finger of the photochemical reactor and the reactor assembled. Nitrogen streams were bubbled through a 2.0% solution of biacetyl in ethyl acetate (5 cc/sec) and monomer (5 cc/sec) and into the reactor for 35 minutes. During the last 20 minutes the samples were irradiated with a 200-W pyrex-filtered mercury arc from 2 cm distance. The sample was removed from the cold finger, washed with ethanol, distilled water, dried, and conditioned.

The percentage uptake of grafted monomer was (a) - 7.7%, (b) - 0.8%.

| Properties of the Grafted Surface | |
|---|---|
| Test Procedure or Method | Test Results or Data |
| Tensile Properties of yarn for (a) samples only (ASTM D2256-69) | Breaking Strength = 848±95 g (761±130g) % Elongation at Break = 32±4% (31±4%) Energy to Break = 765±185g (635±188 g-cm) |
| Scanning Electron Microscopy of fabric sample at 550 to 2300X magnification. | Findings - A somewhat uneven coating of polymer is present on the fiber surface, with some large nodes of polymer present. |

Polyester treated with methyl acrylate showed significant improvement in tensile properties, although the grafting was not as even as expected.

EXAMPLE 25

This example illustrates a methyl acrylate monomer grafted onto a polymeric substrate comprising polypropylene fabric (Test Fabrics Herculon Type 40, 5oz., 2 × 2 ply, No. 967).

The polypropylene samples were wet out in different solvents in each case; 1,2-dichloroethane (DCE), n-propanol (POH), N,N-dimethylformamide (DMF), Dimethylsulfoxide (DMSO), and benzene (Bz) and excess solvent removed using a laboratory pad. The samples were stapled to a wire screen and placed in a photochemical reactor equipped with two gas outlets and a gas inlet. Nitrogen streams were passed through a 1.0% solution of biacetyl (5 cc/sec) dissolved in methanol and through monomer (5 cc/sec) and then into the reactor for 30 minutes. During the last 15 minutes the samples were irradiated by 200-W pyrex-filtered mercury arc, extracted with benzene, dried, and conditioned.

The percentage uptake of grafted monomer was DCE = 1.8%, POH = 0.7%, DMF = 8.4%, DMSO = 7.4%, Bz = 0.7%.

| Properties of the Grafted Surface | |
|---|---|
| Test Procedure or Method | Test Results or Data |
| Tensile Properties of yarn for DMSO-wetted sample (ASTM D2256-69) | Breaking Strength = 421±42g (433±54g) |
| Monsanto Wrinkle Recovery for DMF-wetted sample warp direction, dry (AATCC 66-1968) | % Elongation at Break = 69±5% (68±8%) Energy to Break = 574±95 g-cm (603±143 g-cm) |
| Cantilever Stiffness (G) (ASTM D1388-64) for DMSO-wetted sample | Recovery Angle- Dry = 119° (127°) Wet = 130° (113°) G = 673 mg-cm (382 mg-cm) |

Methyl acrylate was successfully grafted to polypropylene fabric particularly when the fabric was wet out with solvents which swell the fiber (DMSO or DMF). The wet wrinkle recovery of the treated fabric was improved.

EXAMPLE 26

This example illustrates a N-methylolacrylamide monomer grafted onto a polymeric substrate comprising wool fabric (Burlington 1 × 1 plain weave worsted, style 6561).

The wool samples were immersed in a 10% solution of monomer (a) or in a 10% solution of monomer containing 0.5% zinc nitrate catalyst (b), and excess solution removed by passing the samples through a laboratory pad. The samples were stapled to a wire screen and placed in a photochemical reactor equipped with a gas inlet and gas outlet. Nitrogen was bubbled through a 1.0% solution of aqueous biacetyl (10 cc/sec) and into the reactor for 35 minutes. During the final 20 minutes the samples were irradiated with a 200-W pyrex-filtered mercury arc from 6 cm distance. Following irradiation the samples were pressed at 150°C for one minute, washed thoroughly with hot water, dried, and conditioned.

The percentage uptake of grafted monomer was (a) = 9.4%, (b) = 12.1%.

| Test Procedure or Method | Properties of the Grafted Surface<br>Test Results or Data |
|---|---|
| Cantilever Stiffness (G)<br>(ASTM D1388-64) | G - (a) = 2438 mg-cm (248 mg-cm),<br>(b) = 1105 mg-cm (168 mg-cm),<br>Control - 154 mg-cm |
| Monsanto Wrinkle Recovery,<br>warp direction, dry and<br>and wet (AATCC 66-1968) | Wrinkle Recovery Angle - Dry =<br>(a) = 145° (154°), (b) = 131°<br>(157°), Control = 160°<br>Wet = (a) = 145° (122°), (b) =<br>144° (128°), Control = 111° |
| Durable Press Appearance<br>Rating (AATCC 124-1969),<br>Washing Condition I,<br>Tumble Dry | Fabric Smoothness Rating - (a) =<br>4.2 (4.2), (b) = 4.7 (3.7),<br>Control = 3.2 |
| Tensile Properties of yarn<br>(ASTM D2256-69) | Breaking Strength - Dry - (a) =<br>393±40g (364±37g), (b) = 451±52g<br>(401±56g), Control = 377±39g<br>Wet - (a) = 298±41g (286±34g),<br>(b) = 298±52g (293±30g),<br>Control = 317±55g.<br>% Elongation at Break - Dry -<br>(a) 27±4% (33±4%), b = 36±3%<br>(35±5%), Control = 36±6%<br>Wet - (a) = 86±12% (88±11%),<br>(b) = 96±3% (98±5%),<br>Control = 53±4%<br>Energy at Break - Dry - (a) =<br>530±134 g-cm (571±59 g-cm),<br>(b) = 855±150 g-cm (639±175 g-cm),<br>Control = 699±183 g-cm<br>Wet - (a) = 474±92 g-cm (455±82 g-cm),<br>(b) = 511±96 g-cm (509±51 g-cm,<br>Control = 537±277 g-cm |
| Scanning Electron<br>Microscopy of fabric<br>samples at 500 to 2500X<br>magnification | Findings - The polymer formed in<br>an irregular manner on the surface<br>of the fabric. |

Wool treated with monomer and sensitizer in the presence and absence of zinc nitrate catalyst showed significant uptakes of polymer and increases in fabric stiffness as might be expected for a crosslinked durable press resin. The wet wrinkle recovery values of the wool treated with both monomer and biacetyl and then crosslinked using zinc nitrate catalyst and heat had excellent durable press properties compared to control. In addition, the tensile properties of the wool were only slightly affected by the treatment. This could serve as a durable treatment for wool.

EXAMPLE 27

This example illustrates a N-methylolacrylamide monomer grafted onto a polymeric substrate comprising polyester-cotton fabric (50:50) blend (Test Fabrics 5 oz. 2 × 2 Blue C polyester-mercurized cotton, No. 9503).

The procedure was the same as in Example 26 except a 5% aqueous solution of monomer with 0.25% zinc nitrate catalyst and 3 × 6 inches samples of polyester-cotton were used.

The percentage uptake of grafted monomer was 5.7%.

| Test Procedure of Method | Properties of the Grafted Surface<br>Test Results or Data |
|---|---|
| Cantilever Stiffness (G)<br>(ASTM D1388-64)<br>Monsanto Wrinkle Recovery,<br>warp direction, dry and<br>wet (AATCC 66-1968)<br>Durable Press Appearance<br>Rating (AATCC 124-1969),<br>Wash Condition I,<br>Tumble Dry | G = 2410 mg-cm (251 mg-cm),<br>Control = 198 mg-cm<br>Wrinkle Recovery Angle - Dry =<br>80 (121), Control = 124°<br>Wet = 129° (118°), Control = 117°<br>Fabric Smoothness Rating =<br>3.5 (3.7), Control = 2.7 |

The treated fabric showed a significant uptake of polymer and a great increase in fabric stiffness as would be expected with a highly cross-linked durable press finish. The finish lowered the dry wrinkle recovery of the fabric but improved the wet wrinkle recovery. The smoothness of the fabric after washing and tumble drying was not significantly different than fabric treated with monomer and zinc nitrate catalyst only, but did have a higher smoothness rating than untreated fabric. Changes in the treatment conditions might further enhance the durable press properties of the treated fabric.

EXAMPLE 28

This example illustrates a methyl methacrylate monomer grafted onto a polymeric substrate comprising wool fabric (Burlington 1 × 1 plain weave worsted, style 6561).

Wool samples (3 × 6 inches) were wet out in water and excess water removed by passing the fabric through a laboratory pad. The samples were stapled on a wire screen and placed in photochemical reactor with two gas inlets and a gas outlet. Nitrogen streams were bubbled through a 1.0% aqueous biacetyl solution (5 cc/sec) and a monomer solution (5 cc/sec) and into the reactor for 15 minutes. The nitrogen flows were continued while the samples were irradiated from 6 cm distance for 15 minutes for (a), 20 minutes for (b), with a 200-W pyrex-filtered mercury arc. Following irradiation, the samples were extracted with benzene, dried and conditioned.

The percentage uptake of grafted monomer was (a) = 6.3%, (b) = 12.7%.

ation of hand (feel) or stiffness. The washing studies show that the treated wools undergo a significant reduction in shrinkage through repeated washings and at the same time possess a much less wrinkled appearance after prolonged washing, although only small changes in Monsanto wrinkle recovery are found. The hand of the treated wools is similar to control, and the stiffness is very nearly the same as untreated wool. The treated fabrics also show slightly improved release of oily stains on laundering. Treatment of wool with this monomer by solution techniques would give a very boardy unacceptable fabric.

EXAMPLE 29

This example illustrates a 2,2,2-trifluoroethyl methacrylate monomer grafted onto a polymeric substrate comprising cotton fabric (Test Fabrics 80 × 80 mercerized print cloth, No. 400W).

The cotton samples (3 × 6 inches) were wet out with water (a) or N,N-dimethylformamide (b), stapled to a wire screen, and placed in a photochemical reactor equipped with 2 gas inlets and one gas outlet. Nitrogen streams were bubbled through a 1.0% aqueous biacetyl solution (5 cc/sec) and through monomer (5 cc/sec) and into the photochemical reactor for 45 minutes. During the final 30 minutes the samples were irradiated with a 200-W pyrex-filtered mercury arc from 6 cm

| Test Procedure or Method | Properties of the Grafted Surface Test Results or Data | | |
|---|---|---|---|
| Felting Shrinkage- | Percent Area Shrinkage After | | |
| Machine wash in hot (140°F) water with 5 lb. ballast, and 70 g. AATCC detergent for 15 minutes each wash. | 5 washes | 10 washes | 15 washes |
| | Cont. 8.1 (1.7) | 15.3 (1.7) | 22.9 (1.7) |
| Durable Press Appearance Ratings after tumble drying in parentheses (AATCC 124-1969) | a 6.9 (1.7) | 10.5 (1.7) | 14.0 (3.0) |
| | b 8.1 (2.3) | 8.5 (2.7) | 10.6 (2.3) |
| Cantilever Stiffness (G) (ASTM D1388-64) | Cantilever Stiffness (G) Control - 166 mg-cm a - 163 mg-cm b - 201 mg-cm | | |
| Monsanto Wrinkle Recovery, warp direction, dry and wet (ASTM 1295-67) | | | |
| Soil Release: Oily Stain Release Method (AATCC 130-1969) Washing Procedure I | Recovery Angle-Dry, Control - 163° a - 163° b - 158° Wet, Control - 123° a - 120° b - 109° Stain Release Rating, Control - 1.0 a - 1.3 b - 1.5 | | |

The treatment of the wool with methyl methacrylate gave a product which showed greatly reduced felting shrinkage, improved appearance after laundering, and improved oily stain release without significant alter-distance. After irradiation, the samples were washed with hot water, dried, and conditioned.

The percentage uptake of grafted monomer was a = 0.4%, b = 4.7%.

| Test Procedure or Method | Properties of the Grafted Surface Test Results or Data |
|---|---|
| Water Repellency: Spray Test (AATCC 22-1967) | Spray Rating (a) = 0 (b) = 25 (0) |
| Oil Repellency: Hydrocarbon Resistance Test (AATCC 118-1966) | Oil Repellency Rating (a) = <1 (b) = <1 (<1) (Spreading of oil was slower on treated fabric) |
| Soil Release: Oily Stain Release Method (AATCC 130-1969) Washing Procedure | Stain Release Rating a = 3.0 b = 3.0 (2.2) |

| Properties of the Grafted Surface | |
|---|---|
| Test Procedure or Method | Test Results or Data |
| II | |

The cotton treated with the higher uptake of polymer (b) showed some water repellency, and improved stain release properties, while the oil repellency of the fabric was essentially unchanged. The stain release rating for the cotton treated with the lower uptake of polymer (a) was also improved. The above treatment imparts some water repellency and improved stain release properties to the cotton without marked change in the properties of the fabric. Other fluoropolymer finishes applied by this technique may show superior properties.

EXAMPLE 30

This example illustrates a 2,2,2,-trifluoroethyl methacrylate monomer grafted onto a polymeric substrate comprising nylon fabric (test fabrics spun type 200, No. 358)

Same as Example 29 except 3 × 6 inches nylon samples were used. Water (a) and N,N-dimethylformamide (b) were used as wetting agents.

The percentage uptake of grafted monomer was (a) - 1.1%, (b) - 0.8%.

| Properties of the Grafted Surface | |
|---|---|
| Test Procedure or Method | Test Results or Data |
| Water Repellency: Spray Test (AATCC 22-1967) | Spray Rating (a) = 95 (b) = 70 (0). |
| Oil Repellency: Hydrocarbon Resistance Test (AATCC 118-1966) | Oil Repellency Rating (a) = <1 (b) = <1 (<1) (Spreading of oil was slower on treated fabrics) |
| Soil Release: Oily Stain Release Method (AATCC 130-1969) Washing Procedure II | Stain Release Rating (a) = - (b) = 4.0 (3.7) |

Nylon treated with the polymer by both techniques showed markedly improved water repellency, but no significant increase in oil repellency. Also slight improvement in the soil release properties of the nylon treated by method (b) was observed. This treatment imparted significant water repellency properties to the nylon without significant change in the hand or aesthetics of the fabric. Although 2,2,2-trifluoroethyl methacrylate was successfully grafted to polyester (3.6%) and polypropylene (3.9%) fabrics using the vapor-phase grafting technique and N,N-dimethylformamide as wetting agent, no significant improvement in the water or oil repellency or stain release properties of these fabrics were found.

EXAMPLE 31

This example illustrates a 2,2,2,-trifluoroethyl methacrylate monomer grafted onto a polymeric substrate comprising rayon fabric (test fabrics viscose challis print cloth, No. 266).

Same as Example 29 except 3 × 6 inches rayon samples were used. Water (a) and N,N-dimethylformamide (b) were used as wetting agents.

The percentage uptake of grafted monomer was a = 2.0, b = 7.6%.

| Properties of the Grafted Surface | |
|---|---|
| Test Procedure or Method | Test Results or Data |
| Water Repellency: Spray Test (AATCC 22-1967) | Spray Rating (a) = 0 (b) = 75 (0) |
| Oil Repellency: Hydrocarbon Resistance Test (AATCC 118-1966) | Oil Repellency Rating (a) = <1 b = <1 (<1) (Spreading of oil was slower on treated fabrics) |
| Soil Release: Oily Stain Release Method (AATCC 130-1969) Washing Procedure I | Stain Release Rating (a) = 2.0 (b) = 3.5 (1.4) |

The rayon treated with the higher uptake of polymer (b) showed good water repellency, and a markedly improved stain release rating, while no change in the oil repellency was found. At higher uptakes of fluoropolymer (b) the rayon becomes water repellent and exhibits enhanced stain release properties without great change in aesthetic properties.

We claim:

1. A vapor phase method for forming a graft copolymer in the presence of low energy irradiation comprising the steps of depositing a wetting agent onto the surface of a polyamide polymeric substrate; and contacting said substrate with an unhalogenated vinyl monomer from a vapor source, said monomer including substituted groups selected from the group consisting of organic acids and their derivatives, organic and inorganic esters and ethers and cyanide in the presence of light energy, the majority of which comprises photons having wavelengths over 3000 S., and contacting said wetted substrate with a volatile photosensitive compound from a vapor source, said photosensitive compound being capable of activation by exposure to said light to a state sufficient to create grafting sites on said polymeric substrate to there by graft polymerize said monomer at said sites, said wetting agent having an affinity for said polymeric substrate, monomer and photosensitive compound.

2. A method as in claim 1 in which said photosensitive vapor is selected from the group consisting of diketones and α, β unsaturated carbonyl compounds.

3. A method as in claim 1 in which at least 75% of said light comprises photons having wavelengths over 3000 A.

4. A method as in claim 1 in which said photosensitive vapor is biacetyl.

5. A method as in claim 1 in which said polymeric substrate is in the form of a fiber.

6. A method as in claim 1 in which said polymeric substrate is in the form of a fabric.

7. A method as in claim 1 in which said polymeric substrate is in the form of a sheet.

8. A method as in claim 1 in which said monomer is selected from the group consisting of acrylic acid, substituted acrylic acids, acrylates, substituted acrylates, acrylonitrile and acrylamides.

9. A method as in claim 1 in which said monomer is soluble in said wetting agent.

10. A product formed by the process of claim 1.

11. A product formed by the process of claim 8.

* * * * *